(12) United States Patent
Stafford et al.

(10) Patent No.: US 7,001,300 B1
(45) Date of Patent: Feb. 21, 2006

(54) REPLACEMENT SOLENOID SWITCH VALVE ASSEMBLY

(75) Inventors: Maura Jane Stafford, Warner Robbins, GA (US); Robert C. Warnke, Spooner, WI (US)

(73) Assignee: Sonnax Industries, Inc., Bellows Falls, VT (US)

( * ) Notice: Subject to any disclaimer, the term of this patent is extended or adjusted under 35 U.S.C. 154(b) by 64 days.

(21) Appl. No.: 10/783,346

(22) Filed: Feb. 20, 2004

(51) Int. Cl.
*F16H 31/00* (2006.01)

(52) U.S. Cl. .................................................. 475/127
(58) Field of Classification Search ........... 137/625.69; 475/127, 116; 29/888.011, 889.1, 402.08
See application file for complete search history.

(56) References Cited

U.S. PATENT DOCUMENTS

| | | | | |
|---|---|---|---|---|
| 3,897,698 A | * | 8/1975 | Ohsaka | ........................ 475/61 |
| 4,531,709 A | * | 7/1985 | Maddalozzo | ................. 251/48 |
| 4,545,407 A | * | 10/1985 | Dudash | ....................... 137/596 |
| 5,031,656 A | | 7/1991 | Benford et al. | ............. 137/238 |
| 6,206,038 B1 | * | 3/2001 | Klein et al. | ............ 137/596.17 |
| 6,601,822 B1 | * | 8/2003 | Tachibana et al. | ...... 251/129.15 |

* cited by examiner

*Primary Examiner*—Dirk Wright
(74) *Attorney, Agent, or Firm*—Clifford F. Rey

(57) ABSTRACT

A replacement solenoid switch valve assembly for an automatic transmission system is disclosed. The switch valve assembly includes a switch valve member, which acts in conjunction with an interlocking valve disc set. The disc set is configured for reciprocating movement in tandem and also enables axial shifting movement of the discs relative to one another to support the functions of the solenoid switch valve assembly. This is accomplished by providing an axial stem which projects in perpendicular relation from a first disc. A mating hole in the second disc is radially disposed on the stem in sliding engagement thereon effectively interlocking the discs in alignment. In an installation method of the present invention, the tandem disc set is provided in standard size as a drop-in replacement for valve bodies that do not exhibit excessive bore wear and also in an oversize embodiment for valve bodies showing excessive wear.

9 Claims, 7 Drawing Sheets

REPLACEMENT SOLENOID SWITCH VALVE ASSEMBLY

BACKGROUND OF INVENTION

The present invention relates to automatic transmission systems and, more particularly, to a solenoid switch valve for Chrysler 41TE/42LE transaxles.

A common problem with the Chrysler 41TE/42LE (hereinafter "Chrysler") transaxles is the failure of the torque converter clutch piston and its friction ring material due to erratic torque converter clutch control. This hydraulic control failure is often caused by a malfunctioning solenoid switch valve assembly within the valve body of the transaxle.

With reference to the drawings herein, the original equipment manufacture (hereinafter "OEM") solenoid switch valve assembly 100 (i.e. SOL SW VALVE) determines whether the low/reverse lock-up solenoid is going to operate the low/reverse apply circuit (FIG. 1) or, alternatively, the lock-up apply circuit (FIG. 2). Because the solenoid switch valve assembly 100 reciprocates between the low/reverse apply circuit and the lock-up apply circuit operating positions, the mating valve bore is subject to mechanical wear by the reciprocating action of the solenoid switch valve discs 110, 112 which comprise a part of the switch valve assembly 100. This wear pattern in the surface of the valve bore causes the switch valve plugs or discs 110, 112 to become misaligned (i.e. cocked) upon axial shifting movement and often to lodge itself within the valve bore in the lock-up apply circuit operating position (FIG. 2).

U.S. Pat. No. 5,031,656 to Benford et al. teaches reciprocating valves in a fluid system of a Chrysler automatic transmission. This patent discloses a solenoid switch valve assembly including reciprocating valve plugs (see Benford et al., FIG. 11A) of a type, which are subject to the problems described hereinabove. The solenoid switch valve assembly of the present invention has been developed to improve upon this prior art design.

In this respect the present invention substantially departs from the conventional concepts and designs of the prior art, and in so doing provides a valve apparatus developed to permit both in tandem reciprocating movement of the valve plugs and also axial shifting movement of the plugs relative to each other to support the functions of such a solenoid switch valve assembly.

SUMMARY OF THE INVENTION

Accordingly, the present invention is an improved solenoid switch valve assembly including a pair of modified valve plugs or discs arranged in end-to-end relation wherein the valve discs comprise an interlocking subassembly or disc set. The present disc set is designed for reciprocating movement in tandem (i.e. acting as a unit) and also to permit axial shifting movement of the discs relative to one another to support the functions of the switch valve. This is accomplished by providing a stem portion projecting from a first valve disc, which engages a mating hole in the second valve disc and, in effect, interlocks the discs in concentric relation. This configuration provides axial shifting movement of the discs relative to each other while maintaining the disc set in concentric relation to the valve bore during operation.

In accordance with an installation method of the present invention, the tandem disc set is provided in standard size as a drop-in OEM replacement set for valve bodies that do not exhibit excessive bore wear and also in an oversize version that requires reaming the bore to an oversize condition in cases of excessive wear.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Prior to describing the present invention in detail it may be beneficial to review the structure and function of the OEM solenoid switch valve assembly of the Chrysler transaxles. With further reference to the drawings there is shown therein an OEM solenoid switch valve assembly, indicated generally at 100 and illustrated in FIG. 3.

Figure 2:
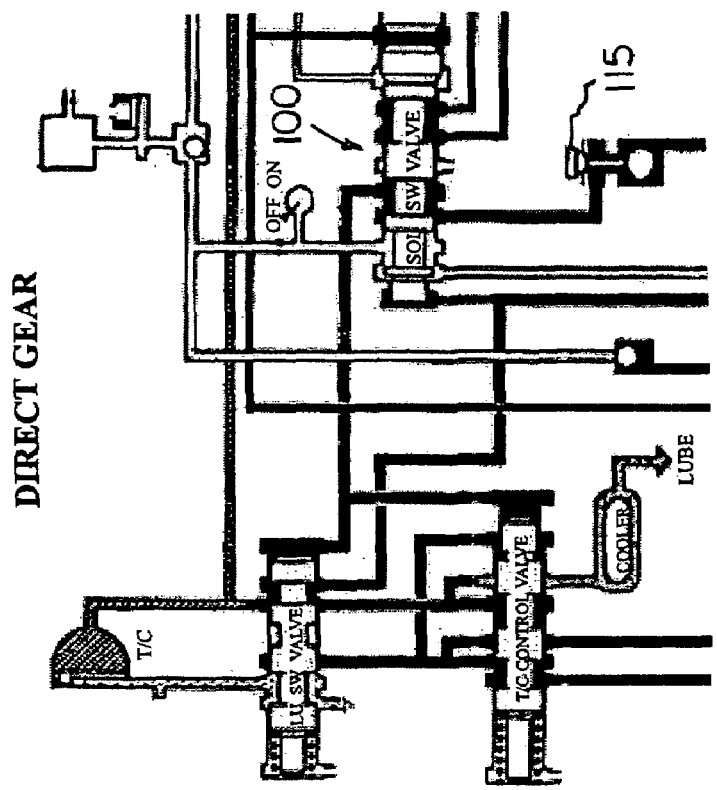
FIG. 2 is a schematic representation of the lock-up apply circuit of the Chrysler transaxle illustrating ATF flow within the solenoid switch valve assembly in the operating mode and is labeled Prior Art.
Figure 1:
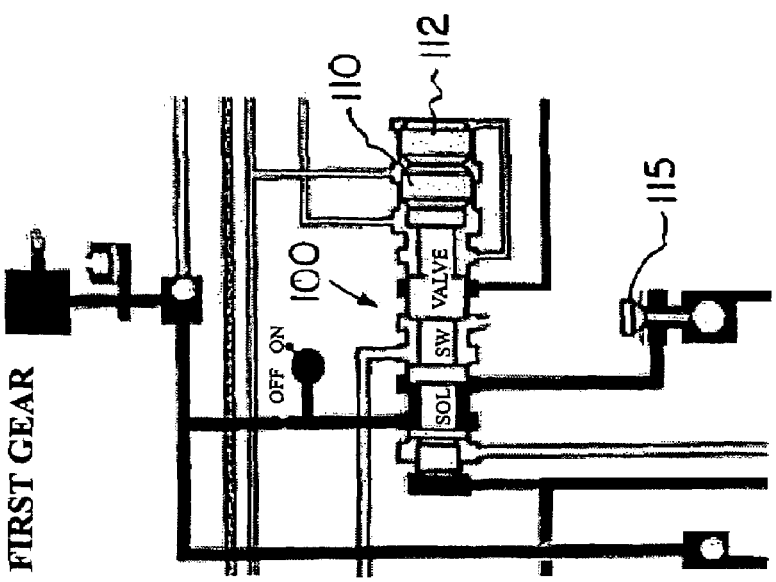
FIG. 1 is a schematic representation of the low/reverse apply circuit of the Chrysler transaxle illustrating ATF flow within the OEM solenoid switch valve assembly in this operating mode and is labeled Prior Art.
Figure 3:
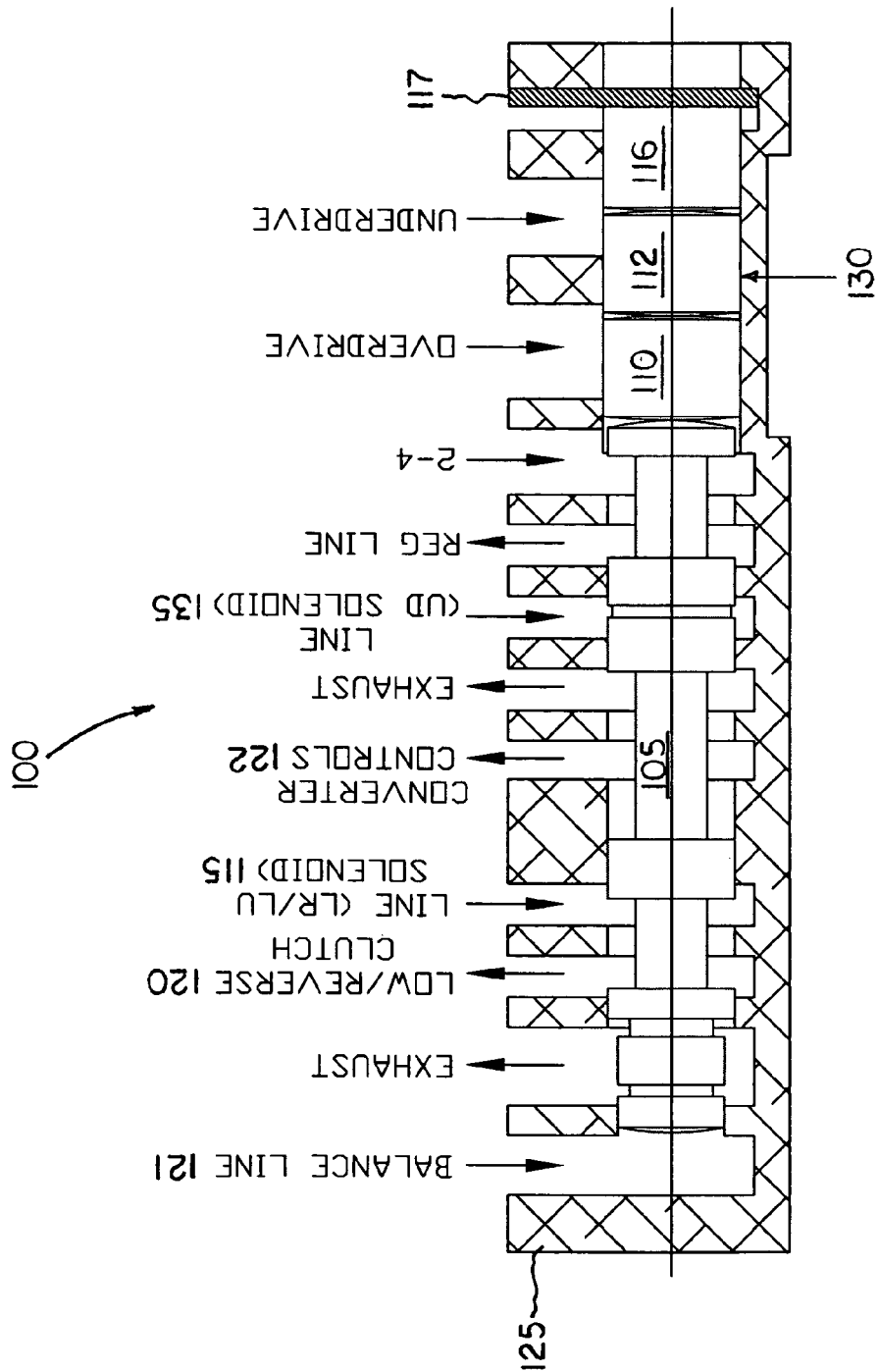
FIG. 3 is a partially cutaway view of the OEM solenoid switch valve assembly and is labeled Prior Art.

The OEM solenoid switch valve assembly 100 comprises a solenoid switch valve member 105, valve discs 110, 112, and an end plug 116, which reside in end-to-end relation within the valve body 125 of the Chrysler transaxle. A retaining clip 117 secures the valve assembly 100 within a valve bore 130 of the valve body 125 (FIG. 3). It will be appreciated that the solenoid switch valve assembly 100, in the absence of a spring-biasing mechanism, is entirely solenoid actuated and shifts position with the ingress of automatic transmission fluid (hereinafter "ATF") into the valve assembly via the communicating solenoid circuits.

The position of the solenoid switch valve assembly 100 determines whether the low/reverse lock-up solenoid 115 is going to feed the low/reverse apply circuit 120 or, alternatively, the so-called lock-up apply circuit, which feeds the torque converter controls as at 122 (FIG. 3) in the overdrive operating mode. Because the solenoid switch valve assembly 100 reciprocates between the low/reverse apply position (see FIG. 3) and the lock-up operating position (i.e. at the opposite extent of its travel), the mating valve bore as at 130 is susceptible to premature mechanical wear by the reciprocating action of the switch valve plugs 110, 112. This is due to the relatively low length-to-diameter ratio of the plugs 110, 112 and an inherent tendency for the plugs to become cocked in the valve bore 130 during axial shifting movement. As a result an abnormal wear pattern in the valve bore 130 can develop and cause the plugs 110, 112 to become lodged in the valve bore holding the switch valve assembly 100 in either the lock-up (i.e. overdrive) or low/reverse operating position.

When the vehicle is brought to a stop, a specific logic sequence is performed by the torque converter module (hereinafter "TCM"). The underdrive solenoid, which is normally open, is momentarily energized or pulsed 'Off' eliminating fluid pressure flow to the solenoid switch valve assembly 100 via the underdrive solenoid circuit as at 135 (FIG. 3). For purposes of this application the term "underdrive" refers to all operating modes of the transaxle excluding the overdrive and reverse gear ranges. This momentary elimination of underdrive fluid pressure shifts the solenoid switch valve assembly 100 into the low/reverse apply circuit operating position via balance line fluid pressure as at 121 (FIG. 3).

When the switch valve discs 110, 112 become lodged in the lock-up position and the vehicle is brought to a stop, if the switch valve 105 does not immediately move to the low/reverse position and remains in the lock-up position, the transaxle will not be able to engage the low/reverse clutch and is effectively in neutral when the vehicle comes to a stop. The TCM senses that the transaxle is still in a forward gear range and reads output speed as coming to a stop.

Figure 4:
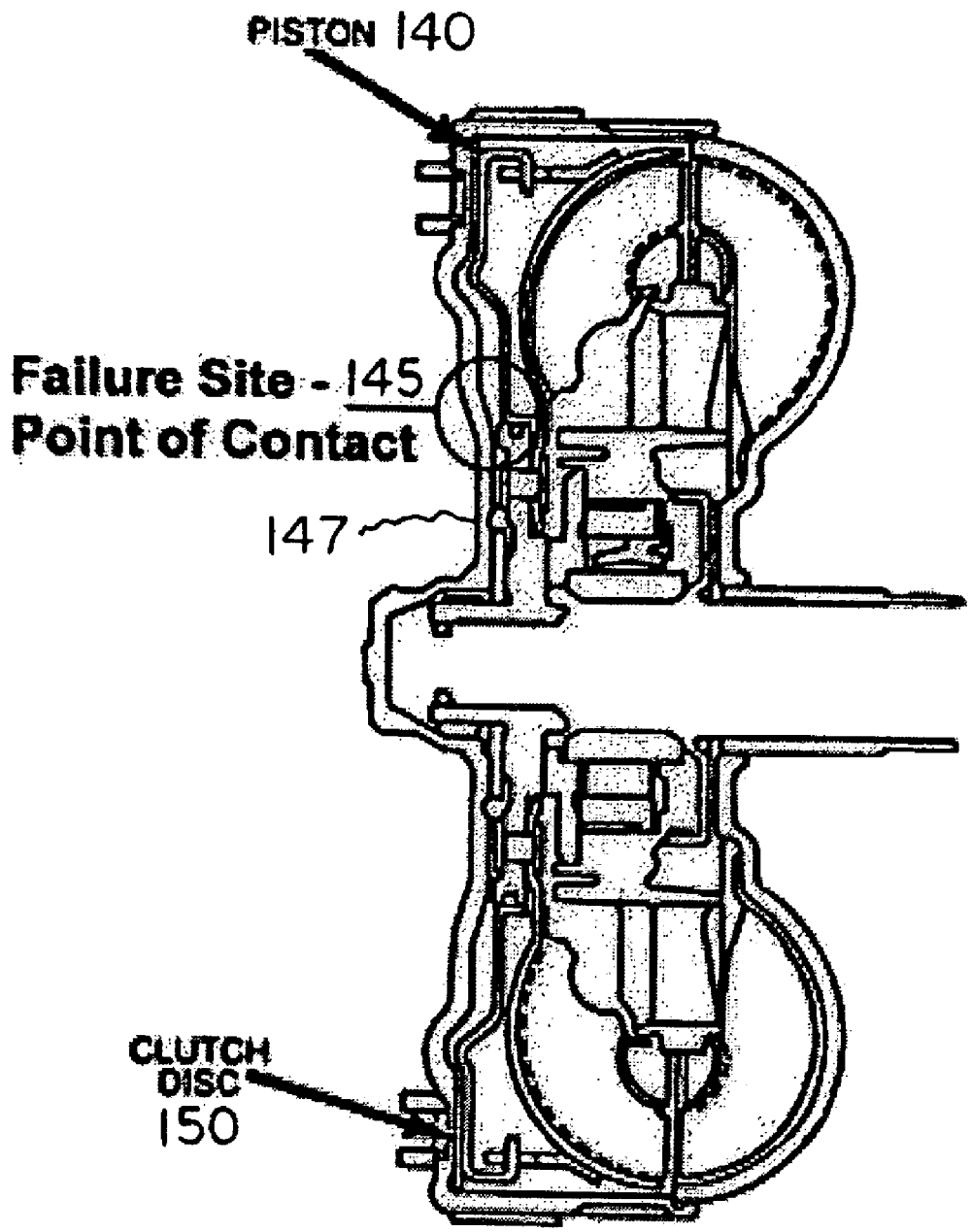
FIG. 4 is a cross-sectional view of a torque converter of the Chrysler transmission indicating the failure sight commonly associated with a malfunctioning OEM solenoid switch valve.

However, since the transaxle is not engaged in any gear as a result of the low/reverse clutch being released, turbine speed is still roughly the same as engine revolutions per minute (RPM) rather than showing zero RPM as it should in normal operation. In response the TCM commands a momentary 'Full On' signal to the low/reverse lock-up solenoid 115 in an attempt to apply the low/reverse clutch. This high volume burst of 120–145 psi is inadvertently sent to the lock-up converter controls as at 122 instead of the low/reverse clutch as at 120 (see flow path FIG. 5). This smashes the converter clutch piston 140 into the converter cover 147 with much more force than it was intended to tolerate bending the inner diameter of the piston as at 145 forward until it contacts the surface of the converter cover 147 (FIG. 4). This immediately generates metal particles from the contact causing spontaneous and sometimes total failure of the torque converter.

In an alternative failure scenario, if the solenoid switch valve discs 110, 112 become mechanically lodged in the low/reverse apply position (FIG. 3), the switch valve assembly will be prevented from shifting into the overdrive position (FIG. 5), which will prevent torque converter lock-up and cause malfunction of the overdrive gear range.

Figure 5:
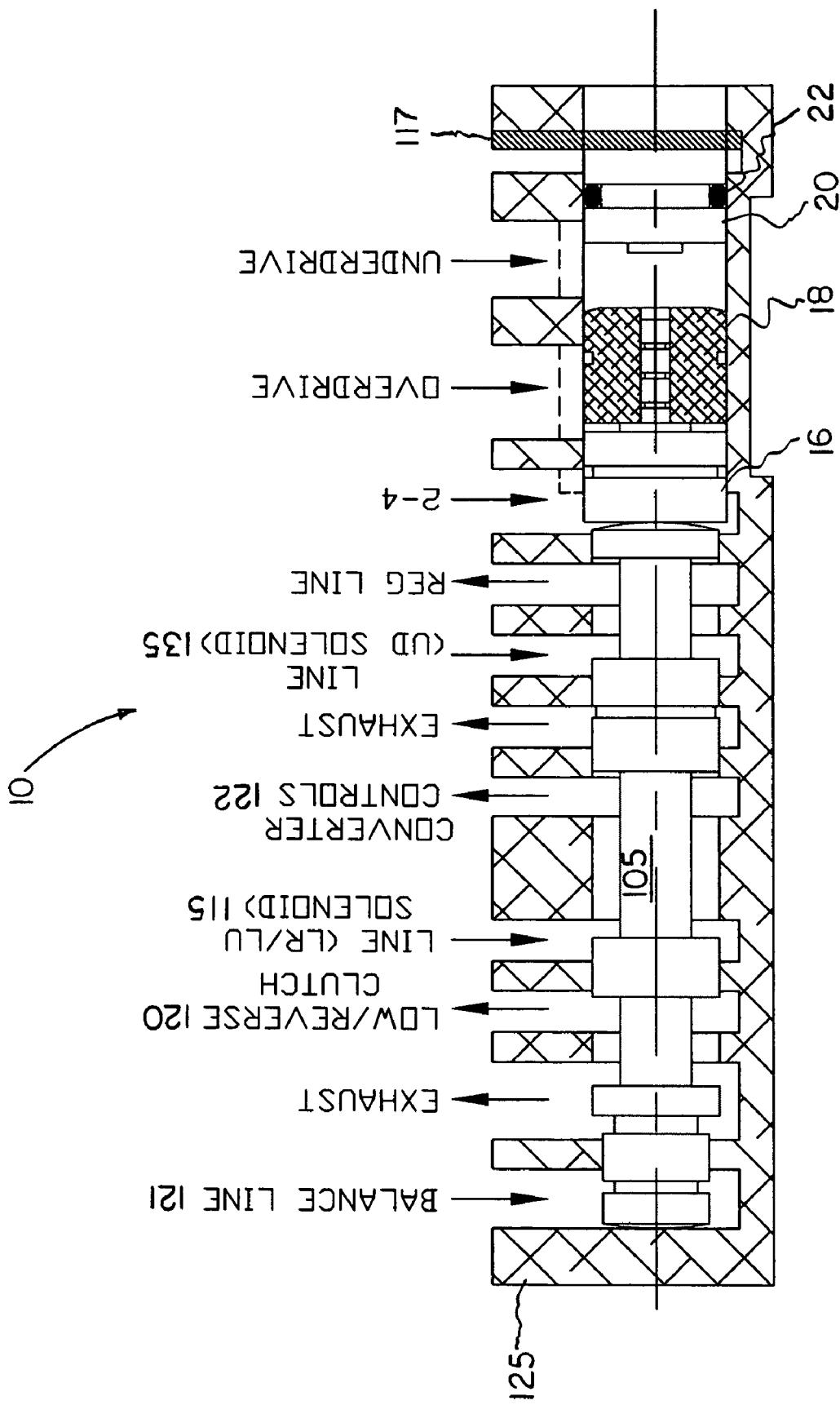
FIG. 5 is a partially cutaway view of the solenoid switch valve assembly of the present invention.

Thus, the present invention has been devised to resolve this problem and will now be described in detail. With reference to FIG. 5 there is shown an improved solenoid switch valve assembly in accordance with the present invention, indicated generally at 10. In one embodiment the present solenoid switch valve assembly 10 comprises an OEM solenoid switch valve member 105, a tandem disc set 50 including discs 16, 18 and the OEM end plug 116, which are disposed within the valve body 125 of the Chrysler transaxle in replacement of the OEM valve assembly 100. An oversize embodiment of the present disc set 50 (FIG. 5) includes a matching oversize end plug 20 with an O-ring seal 22, which resides in a mating, annular groove 24 to positively seal the reamed bore 130. The OEM retaining clip 117 is reusable with both embodiments of the present invention.

Figure 6A:
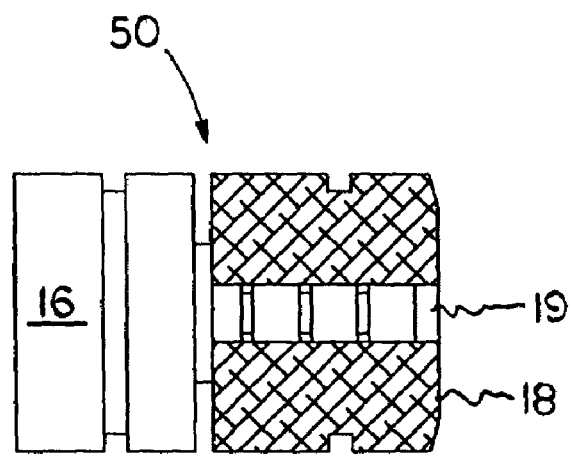
FIG. 6A is a partial cross-sectional view of the tandem disc set of the present solenoid switch valve assembly shown in the low/reverse apply position.
Figure 6B:
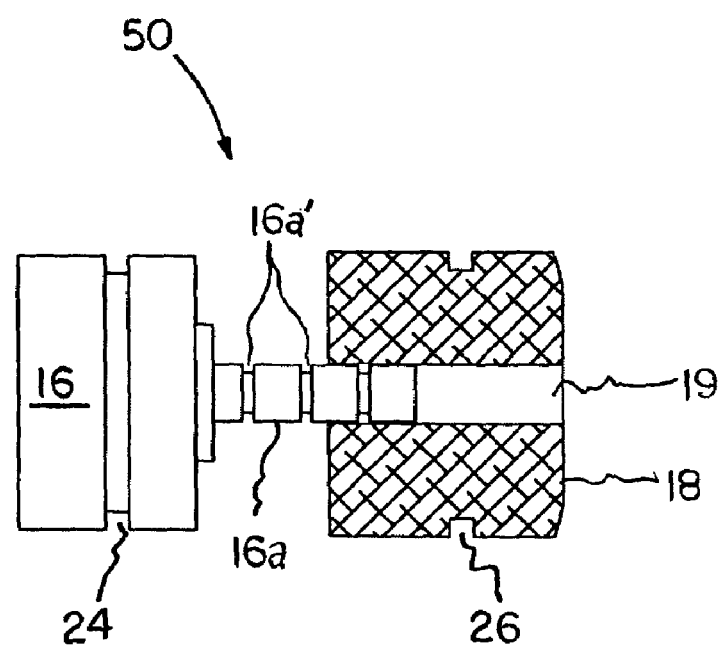
FIG. 6B is a partial cross-sectional view of the tandem disc set of the present solenoid switch valve assembly shown in the lock-up apply position illustrating its axial shifting capability.

In the present switch valve assembly 10 the solenoid switch valve member 105 is unchanged and can be reused absent excessive wear. However, it can be seen that the valve discs 16, 18 are substantially modified in comparison to the OEM plugs 110, 112 (FIG. 3) as clearly shown in FIGS. 6A and 6B. The present invention provides a tandem disc set, indicated generally at 50, comprising the valve discs 16, 18, which are designed for in tandem (i.e. acting in conjunction) reciprocating movement within the valve bore 130 and also for axial shifting movement of the valve discs 16, 18 relative to each other.

This is accomplished by providing a perpendicular stem 16a that projects from valve disc 16, which engages a mating, close-tolerance hole 19 formed in valve disc 18. The stem 16a and hole 19 are dimensioned to a slip fit condition permitting axial shifting movement of the disc 18 on the stem 16a during operation while maintaining both discs 16, 18 in concentric relation. Annular grooves 16a' are formed in the stem 16a at regular intervals to maximize lubrication and to carry away contaminates ensuring that disc 18 are free to shift axially on the stem 16a from the overdrive to underdrive operating modes.

Annular grooves 24, 26 formed in the outside diameters of discs 16, 18 respectively also provide lubrication, carry away contaminates, and function to center the discs 16, 18 within the valve bore 130 to prevent side-loading during operation. The present configuration of the tandem disc set 50 including the interlocked discs 16, 18 prevents the discs from becoming lodged within the valve bore 130 in the lock-up apply circuit position.

Figure 7:
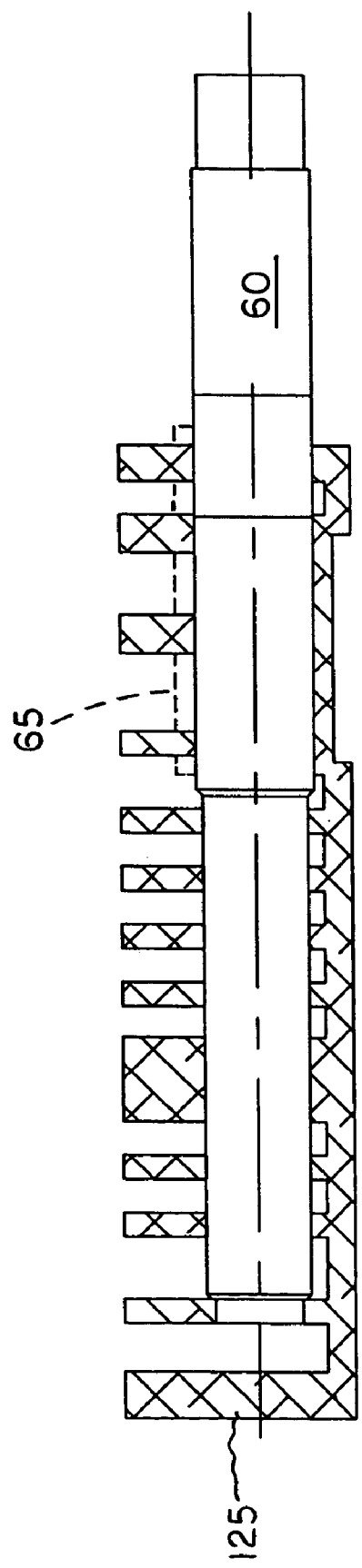
FIG. 7 is a partial cross-sectional view of a reaming tool being inserted into the valve body to enlarge that portion of the bore to receive an oversize tandem disc set.
Figure 8:
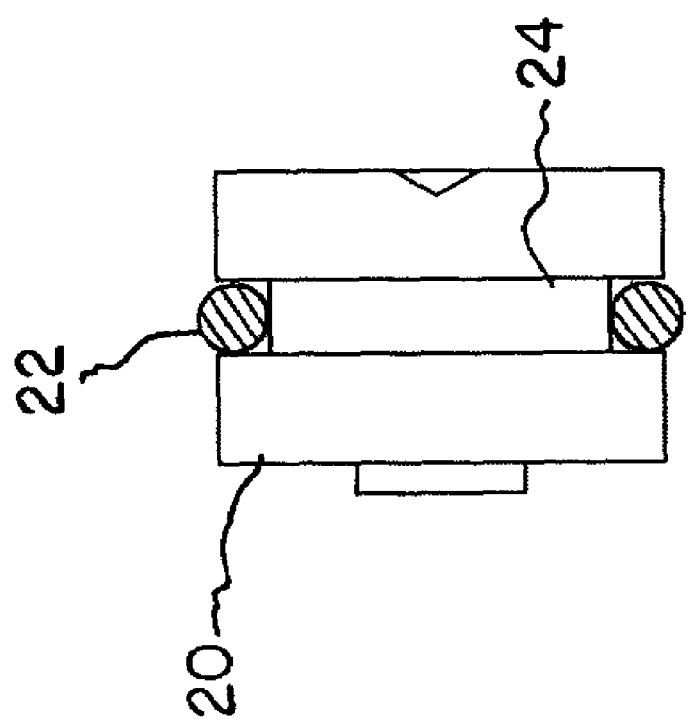
FIG. 8 is an elevational view of the present oversize end plug including an O-ring seal in cross-section.

The present tandem disc set 50 is provided in a kit format to the end user wherein the discs 16, 18 are available in both the original factory size and, alternatively, in an oversize version requiring the use of a reaming tool 60 (FIG. 7). Reaming tool 60 is utilized to enlarge only that portion of the valve bore 130 as at 65 (shown in broken outline, FIG. 7) wherein the disc set 50 and oversize end plug 20 are installed. The OEM solenoid switch valve member 105 and the end plug 116 can be reused with the standard-sized tandem disc set 50 when the valve body 125 does not exhibit excessive wear and reaming is unnecessary.

In an installation procedure for the present disc assembly 10, the OEM solenoid switch valve assembly 100 is initially removed from the valve body 125 and the switch valve discs 110, 112 are discarded. Thereafter, the valve bore 130 is inspected to determine the extent of mechanical wear in the valve bore. Next, a disc set 50 of the required OEM standard size or oversize configuration is selected for reassembly. If the valve bore 130 exhibits excessive wear, it is reamed to a predetermined dimension (i.e. approximately 0.020 inch oversize) using a suitable reaming tool 50 as illustrated in FIG. 7.

Thus, the present invention provides a repair method wherein selective use of standard size and oversize versions of the tandem disc set 50 enables the end user to restore the accurate operation and hydraulic integrity of the solenoid switch valve to factory specifications.

Although not specifically illustrated in the drawings, it should be understood that additional equipment and structural components will be provided as necessary and that all of the components described above are arranged and supported in an appropriate fashion to form a complete and operative solenoid switch valve assembly and installation method incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An improved solenoid switch valve assembly for use in combination with a valve body of an automatic transmission, said solenoid switch valve assembly regulating the flow of automatic transmission fluid to a low/reverse apply circuit in a first position thereof and, alternatively, to a lock-up apply circuit in a second position thereof, said solenoid switch valve assembly including a solenoid switch valve and a pair of valve discs arranged in end-to-end relation for reciprocating movement within said valve body in fluid communication with said circuits, wherein the improvement comprises:

a tandem disc set wherein a mating pair of oversize valve discs are interlocked in sliding engagement to permit axial shifting movement of said discs relative to one another and reciprocating movement of said discs as a unit within said valve bore.

2. The improved solenoid switch valve of claim 1 wherein said tandem disc set is comprised of a first oversize valve disc having an axially projecting stem portion and a second oversize valve disc having a mating hole formed therein to receive said stem portion, said second valve disc being radially disposed on said stem portion such that said discs are engaged in concentric relation to permit axial shifting movement.

3. The improved solenoid switch valve of claim 2 wherein said stem portion includes a plurality of annular grooves formed therein, said grooves functioning to retain lubricating fluid and to carry away contaminants.

4. The improved solenoid switch valve of claim 3 wherein said first oversize valve disc and said second oversize valve disc each include at least one annular groove formed in an outside diameter thereof, said at least one annular groove functioning to retain lubricating fluid and to prevent side-loading of said discs during operation.

5. The improved solenoid switch valve of claim 1 wherein said tandem disc set is provided in a predetermined oversize configuration in the range of 0.020 to 0.025 inches over nominal standard size.

6. A method of improving hydraulic control of a torque converter within a automatic transmission system, wherein said transmission system includes an original equipment solenoid switch valve assembly within a valve body thereof for regulating the flow of automatic transmission fluid to a low/reverse apply circuit and, alternatively, to a lock-up apply circuit within said system, said solenoid switch valve assembly including a solenoid switch valve member and a pair of switch valve discs arranged in end-to-end relation for reciprocating movement within a valve bore in said valve body in fluid communication with said circuits, said method comprising the steps of:

removing said original equipment solenoid switch valve assembly from said valve bore;

inspecting said valve bore for excessive wear;

providing a replacement solenoid switch valve assembly including a tandem disc set having interlocking valve discs imparted with axial shifting movement relative to each other; and installing said replacement solenoid switch valve assembly including said tandem disc set into said valve bore.

7. The method of claim 6 wherein the step of installing further includes the steps of:

reaming said valve bore to a predetermined oversize condition; and inserting a matching oversize replacement solenoid switch valve assembly comprising an oversize tandem disc set and an oversize end plug into said valve bore.

8. The method of claim 7 wherein the step of reaming further includes the steps of:

positioning a reaming tool in concentric relation to an unworn portion of said valve bore wherein said solenoid switch valve member resides; and enlarging an adjacent portion of said valve bore wherein said oversize tandem disc set resides.

9. The method of claim 8 wherein the step of enlarging in carried out by a manual reaming tool.

* * * * *